March 25, 1958 R. STOLTENBERG 2,828,145
RAKE HITCH
Filed March 27, 1956
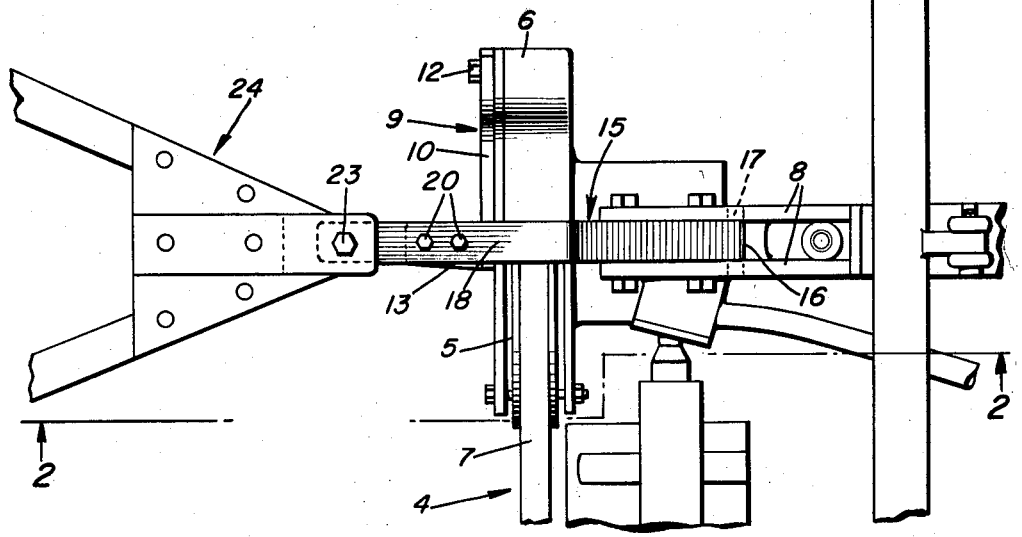
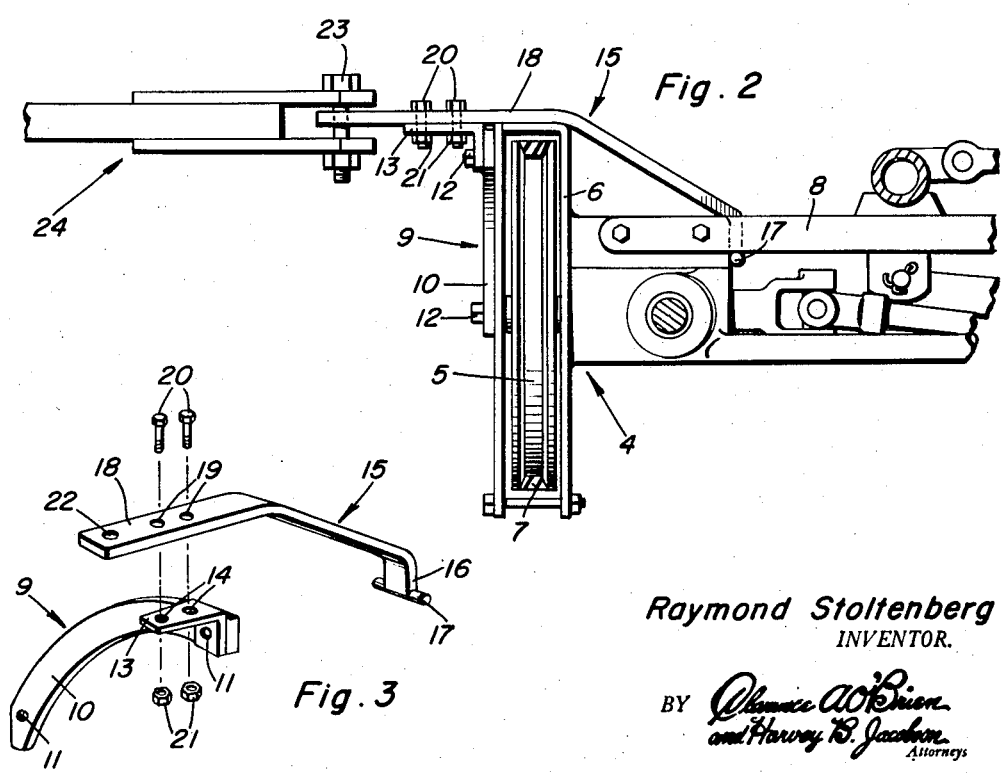
Raymond Stoltenberg
INVENTOR.

2,828,145

RAKE HITCH

Raymond Stoltenberg, Ekalaka, Mont.

Application March 27, 1956, Serial No. 574,133

3 Claims. (Cl. 280—495)

The present invention relates to new and useful improvements in hitches particularly for agricultural machinery and has for its primary object to provide, in a manner as hereinafter set forth, novel means for expeditiously connecting various types of rakes to a rear tractor mounted mower to be drawn therebehind, whereby grass, hay and other crops may be cut and raked in a single operation.

Another important object of the invention is to provide a hitch of the aforementioned character which is adapted to be readily installed for use on a conventional tractor mounted mower without the necessity of structurally altering same and, further, which will interfer in no way with the operation thereof.

Other objects of the invention are to provide a hitch of the character described which will be comparatively simple in construction, strong, durable, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a top plan view, showing a hitch constructed in accordance with the present invention in use;

Figure 2 is a longitudinal sectional view, taken substantially on the line 2—2 of Figure 1; and Figure 3 is a perspective view of the hitch, showing the parts separated.

Referring now to the drawing in detail, it will be seen that reference character 4 designates generally a portion of a conventional mower mounted for operation on the rear end of a tractor. The mower 4 includes the usual drive pulley 5 enclosed in a housing 6 and over which a belt 7 is trained. The mower 4 is mounted on the tractor through the medium of a frame structure comprising a pair of spaced, parallel bars 8.

The embodiment of the present invention which has been illustrated comprises a bracket which is designated generally by reference character 9. The bracket 9 includes an arcuate bar 10 of suitable metal which is mounted circumferentially on the upper back portion of the housing 6. Toward this end, the end portions of the bar 10 are apertured, as indicated at 11, to accommodate bolts 12 for securing said bar in position on the housing 6. Affixed to the upper end portion of the bar 10 and projecting rearwardly therefrom is an arm 13. The arm 13 is provided with longitudinally spaced openings 14, the purpose of which will be set forth.

Mounted on the bracket 9 is a longitudinal angular drawbar 15 of suitable metal. The drawbar 15 terminates in a downturned forward end portion 16 which extends downwardly between the spaced bars 8 and has mounted thereon a crosshead 17. The crosshead 17 is engageable beneath the bars 8 for anchoring the drawbar 15 thereto.

The drawbar 15 further includes a horizontal, rearwardly projecting rear end portion 18 provided with spaced openings 19 which register with the openings 14 for the reception of bolts 20 for securing said end portion 18 of the drawbar firmly in position on the arm 13. Nuts 21 are threaded on the bolts 20. The portion 18 of the drawbar 15 extends rearwardly beyond arm 13 and has formed therein an opening 22 for the reception of a bolt or pin 23 for detachably connecting the tongue 24 of a hay rake or other implement to said drawbar.

It is thought that the invention will be readily understood from a consideration of the foregoing. Briefly, the bar 10 of the bracket 9 is secured in position on the housing 6 through the medium of the bolts 12. The end portion 16 of the drawbar 15 is then inserted downwardly between the bars 8 and given one quarter of a turn to position the crosshead 17 transversely beneath said bars 8. The end portion 18 of the drawbar 15 is then positioned on the arm 13 and secured by the bolts 20. The hitch is now ready for use. The construction and arrangement of the device is such that it will interfere in no way with the operation of the mower 4 and said device may be left permanently thereon. If, however, it should be desired to remove the hitch this may, of course, be accomplished by substantially reversing the foregoing procedure.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hitch for connecting a rake to a tractor mounted mower of the type including a pulley housing and a mounting frame comprising a pair of spaced, parallel bars, said hitch comprising: a bracket mounted on the housing, a drawbar mounted on said bracket, and a crosshead on said drawbar engageable transversely with the mounting bars for anchoring said drawbar thereto.

2. A hitch for connecting a rake to a tractor mounted mower of the type including a pulley housing and a mounting frame comprising a pair of spaced, parallel bars, said hitch including: a bracket comprising an arcuate bar mounted on the housing, a horizontal arm on said arcuate bar, a drawbar secured on said arm, and a crosshead on one end portion of said drawbar engageable transversely beneath the first named bars for anchoring said drawbar thereto.

3. A hitch for connecting an agricultural implement to a tractor mounted mower of the type including a pair of spaced supporting bars, said hitch comprising: a drawbar secured at an intermediate point on the mower and having one end portion extending between the supporting bars, a crosshead on said one end portion of said drawbar engaged beneath the supporting bars for anchoring said drawbar thereto, and means for connecting an implement to the other end portion of said drawbar.

References Cited in the file of this patent

UNITED STATES PATENTS

| 1,499,669 | Krueger | July 1, 1924 |
| 1,726,535 | Bowers | Sept. 3, 1929 |
| 2,187,411 | Bechman | Jan. 16, 1940 |
| 2,595,474 | Marvin | May 6, 1952 |
| 2,669,824 | Dwyer | Feb. 23, 1954 |
| 2,766,835 | Witt | Oct. 16, 1956 |